July 10, 1934.   A. R. AYERS ET AL   1,965,820
WATER GAUGE PROTECTOR
Filed Jan. 18, 1930    2 Sheets-Sheet 1
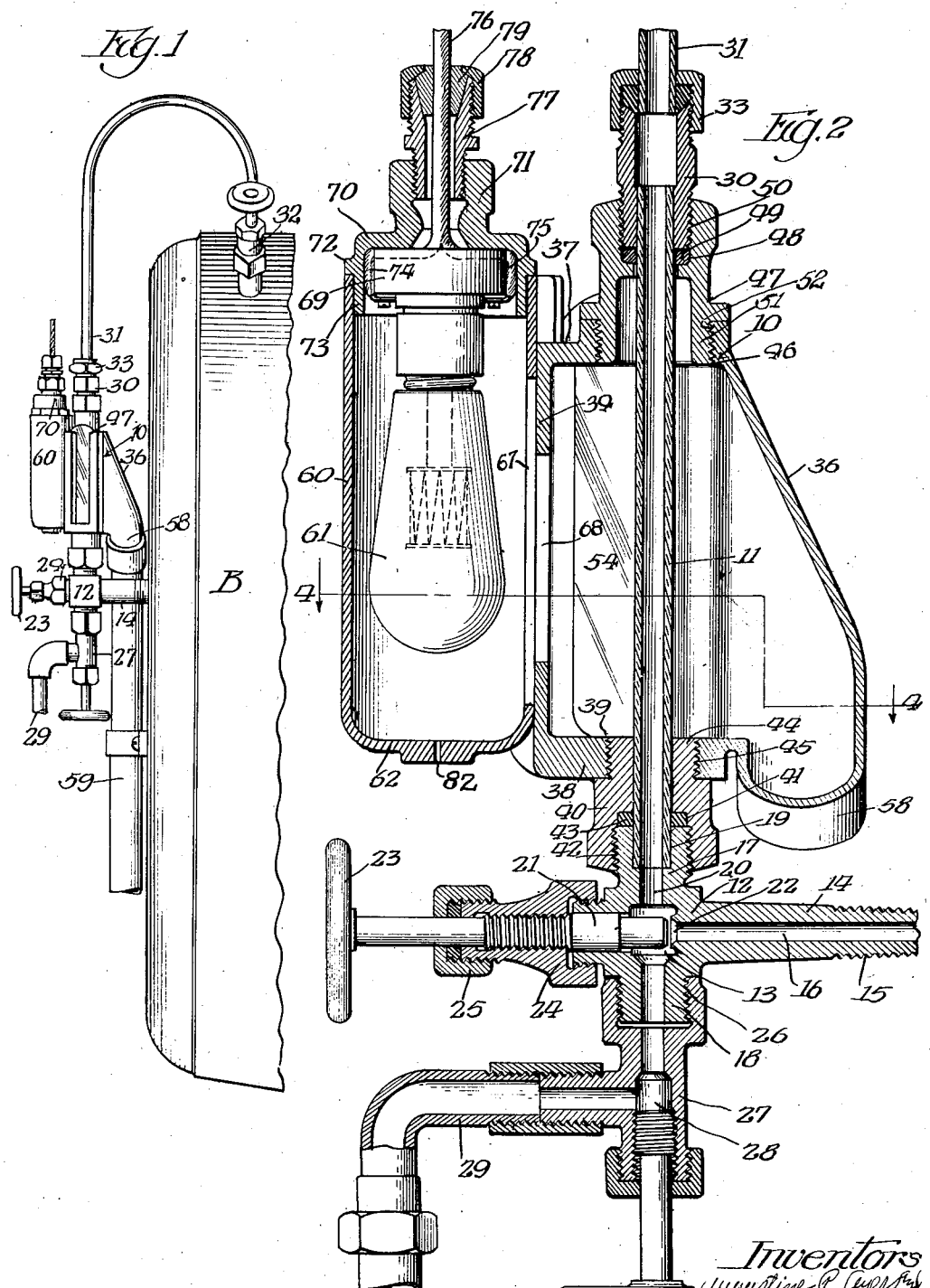

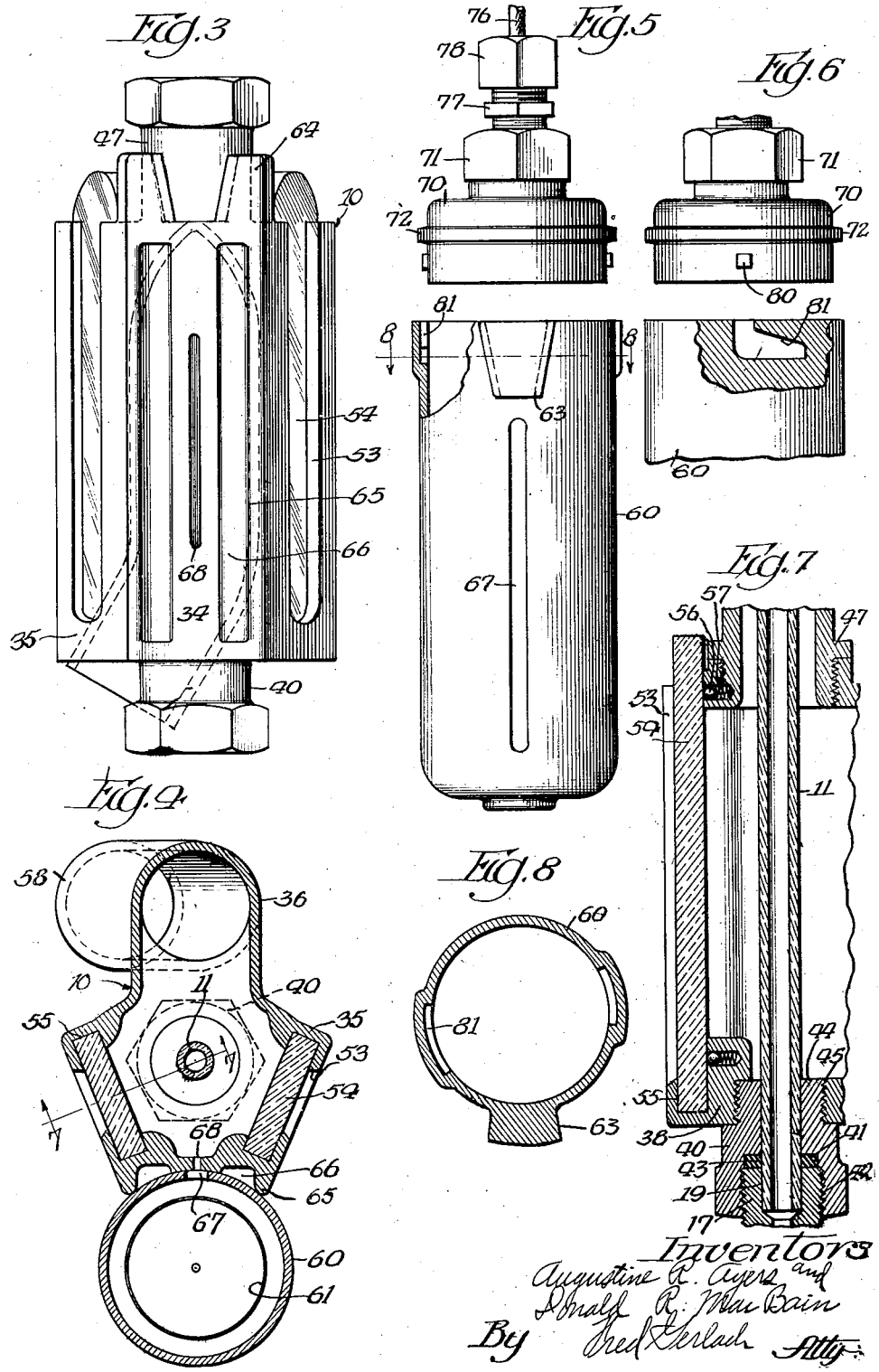

Patented July 10, 1934

1,965,820

UNITED STATES PATENT OFFICE 1,965,820

WATER GAUGE PROTECTOR

Augustine R. Ayers and Donald R. MacBain, Cleveland, Ohio, assignors to The Okadee Company, Chicago, Ill., a corporation of Illinois Application January 18, 1930, Serial No. 421,668

7 Claims. (Cl. 73—54)

The present invention relates to water gauge protectors. More particularly the invention relates to that type of water gauge protector which is adapted primarily for use in connection with a locomotive boiler, operates to safeguard the firemen from injury in the event that the glass tube of the gauge bursts, and comprises an open-sided casing for the glass tube, a pair of members for supporting the tube vertically in the casing, glass plates for closing the openings in the sides of the casing and a depending nozzle which forms a downwardly extending discharge opening or outlet whereby the steam, hot water, and fragments or glass are exhausted from the bottom of the casing whenever breakage of the gauge tube occurs.

One object of the invention is to provide a water gauge protector of the aforementioned type in which the casing has associated therewith and connected thereto a receptacle that houses an electric lamp for illuminating the interior of the casing so that the glass tube is readily visible through the glass plates.

Another object of the invention is the provision of a cap which supports the socket for the electric lamp and is removably connected to the upper end of the receptacle so that, when desired, the lamp may be removed from the receptacle and used as a trouble light in or about the cab of the locomotive.

Another object of the invention is the provision of an interlocking detachable connection between the receptacle and the casing of the protector which permits the receptacle to be readily disconnected from the casing when the casing is removed to permit of the replacement of the glass tube of the gauge.

Another object of the invention is the provision of means for yieldingly holding the glass plates in place in order to avoid rattling and to prevent steam and hot water from passing readily around the side edges of the plates.

A further object of the invention is to provide a water gauge protector of the type under consideration in which the members for supporting the gauge tube are formed separately from the casing and are secured in place by screw thread connections so that replacement thereof may be effected when they become worn and assembly of the casing and the tube is facilitated.

A still further object of the invention is to provide a water gauge protector which is generally of new and improved construction, may be manufactured at a comparatively low cost and is an improvement upon that disclosed in United States Letters Patent No. 1,105,150.

Other objects of the invention and the various advantages and characteristics of the present construction will be apparent to those skilled in the art from a consideration of the following detailed description.

The invention consists in the several novel features hereinafter set forth and more particularly defined by the claims at the conclusion hereof.

In the drawings which accompany and form a part of this specification or disclosure and in which like numerals of reference denote corresponding parts throughout the several views:

Figure 1 is a side elevational view of a locomotive boiler that is equipped with a water gauge protector embodying the invention;

Figure 2 is a vertical section of the protector device, disclosing in detail the manner in which the members for supporting the tube are removably connected to the casing;

Figure 3 is a front view of the casing, showing the vertically extending elongated slot through which pass the rays of light that emanate from the electric lamp and are adapted to illuminate the gauge tube so that the latter is readily visible through the glass plates in the sides of the casing;

Figure 4 is a horizontal section taken on the line 4—4 of Figure 2, illustrating the manner in which the glass plates are mounted in the sides of the casing and disclosing the arrangement of the nozzle which forms an outlet whereby the steam, hot water and fragments of glass are exhausted from the casing whenever breakage of the gauge tube occurs;

Figure 5 is a rear view of the receptacle, exhibiting in detail the construction of the wedge-shaped lug which forms a part of the detachable interlocking connection whereby the receptacle is removably secured to the casing;

Figure 6 is a detail elevational view, showing the manner in which the cap that supports the socket for the electric lamp is removably connected to the receptacle so that it may be disconnected in the event that the lamp is to be used as a trouble light;

Figure 7 is a vertical section taken on the line 7—7 of Figure 4, disclosing the arrangement and construction of the means for holding the glass plates yieldably in place; and Figure 8 is a horizontal section taken on the line 8—8 of Figure 5.

The protector device which forms the subject matter of the present invention comprises a casing 10 which is adapted to extend around a vertically extending glass tube 11. The latter is shown in connection with a locomotive boiler B and operates as a gauge for indicating the height to which the boiler is filled with water. The lower end of the glass gauge tube is associated with a valve casing 12 which is provided with a central chamber 13 and embodies a stem 14. The latter is connected to the boiler by a screw thread connection 15 and has formed therein a longitudinally extending duct 16 for conveying water from the boiler to the chamber 13. In addition to the stem 14, the valve casing 12 embodies an upwardly extending nipple 17 and a downwardly extending nipple 18. The nipple 17 is provided with an annular seat 19 for the lower end of the tube 11 and has formed therein a vertically extending duct 20 for conveying the water from the chamber 13 into the gauge tube. The flow of water through the duct 16 in the stem 14 is controlled by a valve 21 which cooperates with a seat 22 at the inner end of the duct 16. The valve 21 is provided with an operating handle 23 and is supplied with a cap 24 which is removably connected to the casing 12 and embodies a packing nut 25. The downwardly extending nipple 18 is connected by a screw thread connection 26 to a valve casing 27. The latter supports a drain valve 28 which, when in its open position, permits the water in the tube 11 to be exhausted through a discharge pipe 29. The upper end of the tube 11 is mounted in one end of a tubular coupling-member 30 and communicates with the upper end of the boiler B through a pipe 31 and a valve connection 32 which is connected to the boiler and one end of the pipe 31. The other end of the pipe 31 is connected by a packing nut 33 to the upper end of the coupling-member 30. When the drain valve 28 is in its closed position and the valve 21 is disengaged with respect to the seat 22, water from the boiler flows into the gauge tube 11 and rises to a height which indicates the level of the water in the boiler, as well understood in the art. When it is desired to remove the tube or check its operativeness, the valve 21 is shifted into engagement with the seat 22 to close the duct 16, and the drain valve 28 is opened so as to permit the water in the tube to be exhausted through the pipe 29.

The casing 10 operates, as hereinafter described, to safeguard the firemen for the boiler from injury in the event the tube 11 bursts and permits of the escape of steam and hot water from the boiler. It is preferably in the nature of a one-piece casting and comprises a front wall 34, a pair of side walls 35, a back wall 36, a top 37 and a bottom 38. The lower end of the tube 11 extends through a circular opening 39 in the bottom 38 and is surrounded by a supporting member 40. The latter is formed separately from the casing 10 and embodies at the lower end thereof an open-ended socket 41 which receives the upwardly extending nipple 17 of the valve casing 12. The nipple 17 is connected to the supporting member 40 by a screw thread connection 42 and abuts against a washer or gasket 43 in the socket 41 in order to prevent leakage around the tube and into the casing. The upper end of the supporting member 40 is provided with a reduced stem 44 which extends into the opening 39 and is removably secured to the bottom 38 by a screw thread connection 45. The upper end of the gauge tube 11 extends through a circular opening 46 in the top of the casing 10 and is surrounded by a supporting member 47. The latter is similar in design and construction to the supporting member 40 and is provided at the upper end thereof with an open-ended socket 48 for receiving the lower end of the coupling-member 30. A washer or gasket 49 is interposed between the supporting member 47 and the tubular coupling 30 so as to prevent leakage of water around the upper end of the tube 11. The coupling 30 is connected to the member 47 by a screw thread connection 50. The lower end of the supporting member 47 is provided with a reduced stem 51 which extends into the opening 46 and is removably secured to the top 37 by a screw thread connection 52. By forming the two supporting members 40 and 47 separately from the casing 10 and removably securing them in place, assembly of the gauge tube 11 and the casing is facilitated. By utilizing screw thread connections to secure removably the supporting members in place, the members may be replaced without the necessity of employing a new casing whenever they become worn as a result of connection and disconnection with respect to the nipple 17 and the coupling-member 30.

The side walls 35 extend obliquely with respect to the front wall 34 and embody vertically elongated openings 53, the upper ends of which are open. These openings are closed by means of a pair of heavy glass plates 54. The latter are slidably mounted in vertically extending guideways 55 which are formed in the portions of the side walls that define the openings 53. The gauge tube 11 is visible from the outside of the casing 10 through the plates 54. To prevent the plates from rattling and to maintain an effective seal between the side margins of the plates and the guideways 55, a plurality of spring pressed balls 56 are provided. These balls are adapted to engage the plates 54 and are disposed in horizontally extending open-ended recesses 57 which are formed in the top and bottom of the protector casing. The springs for forcing yieldably the balls into contact with the plates are disposed in the recesses 57. The outer ends of the recesses are restricted or narrow so as to prevent the balls from being ejected by the springs when the plates 54 are withdrawn from the guideways 55 for cleaning or replacement purposes. The spring pressed balls 56 exemplify means of an improved character for holding the glass plates yieldably in place in order to avoid rattling and to form a seal between the side parts of the plates and the guideways 55.

The back wall 36 of the protector casing 10 is inclined and joins at its lower end a depending discharge nozzle 58. The latter is connected to a discharge pipe 59 and forms a downwardly extending opening or outlet whereby the steam, hot water and fragments of glass are exhausted from the bottom of the casing whenever the gauge tube 11 bursts. The back wall 36, by virtue of the fact that it is inclined, serves to direct downwardly into the nozzle 58 the water, steam and glass fragments for passage to the pipe 59.

In addition to the casing 10, the protector device comprises a receptacle 60 which serves to house an electric lamp 61 for illuminating the interior of the casing. The receptacle is cylindrical in conformation, embodies a bottom wall 62 and is adapted to fit against the front wall 34 of the casing. It is held in connected relation with respect to the casing by means of a wedge-shaped lug 63 which is attached to and formed integrally with the upper end of the receptacle and is shaped to fit between a pair of ears 64. The latter project upwardly from and are formed integrally with the top 37 of the casing. The lug 63 operates, when shifted into its operative position, to suspend the lamp receptacle and to hold the latter in connected relation with respect to the protector casing 10. When it is desired to remove the receptacle from its operative position it is only necessary to shift the lug 63 upwardly so as to disengage the same from the ears 64. The lug 63 and the ears 64 constitute a simple connection whereby the receptacle is removably attached or connected to the casing 10. The sides of the lug diverge outwardly, as illustrated in Figures 5 and 8. The opposed faces of the ears 64 are outwardly divergent and cooperate with the divergent sides of the lug 63 to prevent the receptacle from being displaced horizontally relatively to the protector casing. The sides of the front wall 34 are provided with vertically extending elongated ribs 65 which project outwardly and form therebetween a hollow seat 66. The portion of the receptacle that is disposed beneath the lug 63 is adapted to fit into the seat 66 and has formed therein a vertically extending slot 67. The latter is adapted to register with a vertically extending slot 68 in the front wall 34 so as to permit the rays of light emanating from the electric lamp 61 to pass into the interior of the casing 10 for illuminating purposes. The slots 67 and 68 are exceedingly small in width so that the possibility of the lamp 61 being damaged by bursting of the glass tube 11 is reduced to a minimum.

The electric lamp 61 is removably connected to a socket member 69 which is secured to the central portion of a cap 70. The latter serves as a closure for the upper end of the receptacle 60 and comprises a tubular base 71, a rim 72 and a depending annular flange 73. The rim 72 is adapted to rest upon the upper edge of the receptacle, as indicated in Figure 2. The annular flange 73 is shaped to telescope into the upper end of the receptacle. The electric lamp 61 is supplied with current by a pair of conductors 74 and 75 which are contained in a flexible sheath 76. These conductors are connected electrically to the socket member 69 and are adapted to be connected to any suitable source of electrical energy. The sheath 76, together with the conductors 74 and 75, extends through the base 71 of the cap and is connected in place by means of a connector nipple 77. The latter is screw threaded to the base 71 and is provided with a connector nut 78 which operates to jamb a bushing 79 around the contiguous portion of the sheath 76. The annular flange 73 of the cap 70 is provided with a pair of diametrically opposite outwardly extending studs 80 which are adapted to fit into bayonet slots 81 in the upper end of the receptacle so as to secure the cap removably in place. When the studs 80 are disengaged from the bayonet slots 81, the cap 70 is free so that the lamp 61 may be withdrawn from the receptacle and used as a trouble light in or about the cab for the boiler B.

The bottom wall 62 of the receptacle has an opening 82 extending therethrough. This opening is adapted to operate as a drain for any water that collects in the receptacle.

When the protector device is in use, the electric lamp 61 will illuminate the interior of the casing 10 by means of the light rays which are transmitted through the vertically extending slots 67 and 68. By reason of the fact that the interior of the casing is illuminated, the attendant or operator in charge of the boiler may readily ascertain the height of the water by perusal of the gauge tube 11 through the glass plates 54. In the event that the tube 11 bursts, the fragments of glass, together with the steam and hot water, are confined in the casing 10 and discharged through the nozzle 58 and the pipe 59. As a result of this arrangement there can be no injury to persons standing in close proximity to the water gauge. After breakage of the tube 11, the flow of steam and water into the casing is stopped by closing the valve 21 and the valve connection 32. Replacement of the glass tube 11 is effected by first removing the receptacle 60 and disconnecting the pipe 31 and then unscrewing the casing 10 from the nipple 17 of the valve 15. The glass plates 54 which serve to close the openings 53 in the side walls of the protector casing may be removed whenever it becomes necessary to clean the tube 11 simply by shifting them vertically out of the guideways 55. When it is desired to use the electric lamp 61 as a trouble light, the cap 70 is manipulated to effect withdrawal of the studs 80 from the slots 81.

The protector device herein disclosed may be manufactured at a comparatively low cost by virtue of the fact that it consists of but a comparatively small number of parts. In view of the fact that provision is made for illuminating the gauge tube the protector device is exceedingly efficient in operation.

The invention is not to be understood as restricted to the details set forth, since these may be modified within the scope of the appended claims, without departing from the spirit and scope of the invention.

Having thus described the invention, what we claim as new and desire to secure by Letters Patent, is:

1. A protector device for the tube of a water gauge, comprising in combination a casing-member adapted to surround the tube and provided with a window and an opening, a receptacle-member provided with an opening, means whereby the receptacle-member is connected removably to the casing-member in a position wherein the opening therein is in registry with the opening in said casing-member, comprising a wedge-shaped lug on one of the members and means on the other member forming a wedge-shaped socket for the lug, and a lamp in the receptacle-member for illuminating the interior of the casing-member via the aforesaid openings so that the tube is visible through the window.

2. A protector device for the tube of a water gauge, comprising in combination an elongated, vertically extending casing adapted to extend around the tube and provided with a window and an opening, a vertically extending receptacle provided with an opening and fitting against the casing in such a position that the opening therein is in registry with the casing opening, means whereby the receptacle is removably connected to the casing, comprising a lug at the top part of the receptacle and a pair of laterally spaced, upwardly projecting ears at the top part of the casing for receiving the lug therebetween, and a lamp in the receptacle for illuminating the interior of the casing via the openings so that the tube is visible through the window.

3. A protector device for the tube of a water gauge, comprising an elongated, vertically extending cast metal casing adapted to surround the tube and provided with a window and an opening, a pair of longitudinally extending, substantially parallel ribs formed integrally with and extending outwardly from the casing and located at opposite sides of the opening, a substantially cylindrical receptacle connected detachably to the casing and arranged so that a portion thereof fits within the space between the ribs and contacts with the part of the casing that defines the opening, the aforesaid portion of the receptacle embodying an opening in registry with the casing opening, and an electric lamp in the receptacle for illuminating the interior of the casing via the openings so that the tube is visible through the window.

4. A protector device for the tube of a water gauge, comprising in combination an elongated, vertically extending, cast metal casing adapted to surround the tube provided with a window and a longitudinally extending, slot-like opening, means formed integrally with the casing and shaped to form about the opening a longitudinally extending, hollow seat, a cylindrical receptacle connected detachably to the casing and arranged so that a portion thereof fits within the hollow seat and engages the part of the casing that defines the opening, the aforesaid portion of the receptacle being provided with a slot-like opening in registry with the casing opening, and an electric lamp in the receptacle for illuminating the interior of the casing via the openings so that the tube is visible through the window.

5. A protector device for the tube of a water gauge, comprising an elongated, vertically extending casing adapted to surround the tube and provided with a window and a longitudinally extending, slot-like opening, means connected to the casing forming a recessed seat about the opening, a substantially cylindrical receptacle removably suspended from the upper end of the casing so that a portion thereof fits within the seat, said portion of the receptacle having an opening therein in registry with the opening in the casing, and an electric lamp in the receptacle for illuminating the interior of the casing via the openings so that the tube is visible through the window.

6. A protector device for the tube of a water gauge, comprising in combination an elongated, vertically extending, cast metal casing adapted to surround the tube and embodying a front wall, a pair of forwardly divergent window-equipped side walls and a back wall, the front wall of the casing being shaped to form a seat and having a longitudinally extending, slot-like opening formed therein, means associated and forming with the back wall of the casing, a duct whereby steam, water and glass may be discharged from the casing in the event of breakage of the tube, a substantially cylindrical receptacle detachably connected to the casing having a portion thereof fitting within the seat in the front wall of the casing and embodying an opening in registry with the casing-opening, and an electric lamp in the receptacle for illuminating the interior of the casing via the openings so that the tube is visible through the window.

7. A protector device for the tube of a water gauge, comprising in combination a casing adapted to surround the tube and provided with a window opening in one side thereof, said casing embodying a guideway around the opening and having a recess drilled therein opposite the guideway, a transparent plate removably retained within the guideway and operative to close the opening, and means for holding yieldingly the plate in place within the guideway consisting of a ball in the outer end of the recess and a coil spring for urging the ball outwardly into contact with the plate, the portion of the casing that defines the outer end of the recess being formed so as to retain the ball partially within the recess and from being ejected from the recess by the spring upon removal of the plate from the guideway.

AUGUSTINE R. AYERS.
DONALD R. MACBAIN.